(12) United States Patent
Min et al.

(10) Patent No.: US 7,693,028 B2
(45) Date of Patent: Apr. 6, 2010

(54) METHOD AND APPARATUS FOR DETECTING PROBE POSITION ERROR IN A DATA STORAGE SYSTEM AND METHOD AND APPARATUS FOR TRACKING DATA

(75) Inventors: Dong-ki Min, Seoul (KR); Seung-bum Hong, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1342 days.

(21) Appl. No.: 11/143,478

(22) Filed: Jun. 3, 2005

(65) Prior Publication Data

US 2005/0270920 A1    Dec. 8, 2005

(30) Foreign Application Priority Data

Jun. 3, 2004    (KR) .................... 10-2004-0040323

(51) Int. Cl.
*G11B 7/00*    (2006.01)
*G11B 9/00*    (2006.01)

(52) U.S. Cl. .................. 369/126; 369/44.28; 369/53.28

(58) Field of Classification Search ........................ None
See application file for complete search history.

(56) References Cited

U.S. PATENT DOCUMENTS

| | | | |
|---|---|---|---|
| 5,132,934 A | | 7/1992 | Quate et al. |
| 5,202,879 A | | 4/1993 | Oguchi et al. |
| 5,396,483 A | | 3/1995 | Matsuda et al. |
| 5,404,349 A | | 4/1995 | Nose et al. |
| 5,471,458 A | * | 11/1995 | Oguchi et al. ................ 369/126 |
| 5,805,541 A | * | 9/1998 | Takeda et al. ................ 369/126 |
| 5,856,967 A | | 1/1999 | Mamin et al. |
| 6,195,313 B1 | | 2/2001 | Seki et al. |
| 6,370,107 B1 | | 4/2002 | Hosaka et al. |

FOREIGN PATENT DOCUMENTS

| | | |
|---|---|---|
| JP | 6-19577 A | 7/1994 |
| JP | 08-287533 A | 11/1996 |

OTHER PUBLICATIONS

Paul Horowitz & Winfield Hill, The Art of Electronics, 2nd ed., Cambridge University Press, 1989.

* cited by examiner

*Primary Examiner*—Jorge L Ortiz Criado
(74) *Attorney, Agent, or Firm*—Sughrue Mion, PLLC

(57) ABSTRACT

An apparatus for detecting a probe position error includes a position error extracting unit extracting probe position errors from signals detected by a probe; a position error adding unit calculating the probe position errors in units of a predetermined time; and a signal processing unit storing a past probe position error calculated by the position error extracting unit and generating a probe position error by processing the past probe position error and a current probe position error. An apparatus for tracking data includes a scanner moving a data storage medium; a probe detecting the signals from a data storage medium; an error detector detecting probe position errors in a half-period of an error extracting signal by applying the error extracting signal used to extract the probe position errors to the signal detected by the probe; and a compensator compensating for the probe position errors detected by the error detector.

27 Claims, 17 Drawing Sheets

METHOD AND APPARATUS FOR DETECTING PROBE POSITION ERROR IN A DATA STORAGE SYSTEM AND METHOD AND APPARATUS FOR TRACKING DATA

This application claims priority from Korean Patent Application No. 10-2004-0040323, filed on Jun. 3, 2004, in the Korean Intellectual Property Office, the disclosure of which is incorporated herein in its entirety by reference.

BACKGROUND OF THE INVENTION

1. Field of the Invention

Methods and apparatuses consistent with present invention relate to data tracking in a data storage system, and detecting probe position error in a data storage system using a probe.

2. Description of the Related Art

Recently, scanning probe microscopy (SPM) has been adapted to a data storage system. In general, the data storage system using scanning probe microcopy has the following construction in order to implement a high recording density.

The data storage system using the scanning microscopy comprises: a data storage medium on which data is recorded, a probe having tips which contact with or are in a close proximity to the data storage medium to read and write data thereon and cantilevers supporting the tips, an XY stage (a scanner) moving the data storage medium, a controller for controlling the data storage system, and a signal processing unit. In addition, in order to read and write data on the data storage medium having the high recording density, a data tracking method needs to be performed in a higher resolution than a size of a data pit.

Conventionally, three types of data tracking methods have been used for the high-density data storage system using the scanning probe microscopy.

In a first type of data tracking method, in addition to the data signal read and written on the data storage medium, a mechanical or electrical signal is used for the data tracking. Examples of the first type are disclosed in U.S. Pat. Nos. 5,132,934, 5,396,483, 5,856,967, and 6,370,107, wherein metal patterns or mechanically-curved structures are formed on the data storage medium. However, it is difficult to accurately adjust the metal patterns and the mechanically-curved structures. In addition, since the mechanically-curved structures are used for a reading/writing mechanism, the first type of data tracking method is not practical.

In a second type of data tacking method, a probe or a data storage medium vibrate to modulate centers of data pits on the data storage medium. An example of the second type is disclosed in U.S. Pat. No. 5,404,349, wherein the data storage medium vibrates at a high frequency, and modulation and demodulation are adapted. However, it is difficult to vibrate the data storage medium at the high frequency. In addition, since the modulation and demodulate are used, the associated detecting circuitry is so complex that there is time delay in detection.

In a third type of data tacking method, relative displacement of centers of data pits on a data storage medium and a probe for reading and writing data are used for the data tracking. Examples of the third type are disclosed in U.S. Pat. Nos. 5,202,879 and 6,195,313, wherein it is necessary to accurately record the data patterns on the data storage medium. In particular, in U.S. Pat. No. 5,202,879, since the data pits can not continuously tracked, a tracking velocity is very low. Therefore, the data tracking method is vulnerable to external disturbance.

SUMMARY OF THE INVENTION

The present invention provides a method and apparatus for detecting a probe position error in a data storage system using a probe capable of continuously detecting horizontal and vertical errors occurring due to disturbance so that, it is possible to easily synchronize centers of data pits on a data storage medium and timings of reading and writing and compensate for a track error (the vertical error).

The present invention also provides a method and apparatus for tracking data by using a method and apparatus for detecting a probe position error in the data storage system capable of continuously detecting horizontal and vertical errors occurring due to disturbance so that, it is possible to easily synchronize centers of data pits on a data storage medium and timings of reading and writing and compensate for a track error (the vertical error)

According to aspect of the present invention, there is provided an apparatus for detecting a probe position error in a data storage system having a data storage medium and a probe for detecting signals by scanning the data storage medium, comprising: a position error extracting unit extracting probe position errors from signals detected by the probe; and a position error adding unit calculating the probe position errors in units of a predetermined time.

The position error extracting unit may be constructed with a multiplier multiplying the signal detected by the probe with a predetermined error extracting signal used to extract the probe position errors, and the position error adding unit may be constructed with an integrator integrating output signals of the multiplier in units of a period of the error extracting signal.

The error extracting signal may be a square wave having a period determined with a ratio of a distance between data pits on the data storage medium and a scanning velocity of the probe and a duty cycle of 50%. The error extracting signal may comprise: a horizontal error extracting signal being a square wave having a period determined with a ratio of a distance between data pits on the data storage medium and a scanning velocity of the probe and a duty cycle of 50%; and a vertical error extracting signal having a period twice the period of the horizontal extracting signal and being synchronized with the horizontal extracting signal, and the multiplier may comprise: a horizontal multiplier multiplying the signal detected by the probe with the horizontal error extracting signal; and a vertical multiplier multiplying the signal detected by the probe with the vertical error extracting signal, and the integrator may comprise: a horizontal integrator integrating an output signal of the horizontal multiplier; and vertical integrator integrating an output signal of the vertical multiplier.

According to another aspect of the present invention, there is provided an apparatus for tracking data in a data storage system having a data storage medium and a probe for detecting signals by scanning the data storage medium, comprising: a scanner moving the data storage medium; a probe detecting the signals from the data storage medium; an error detector detecting probe position errors by applying a predetermined error extracting signal used to extract the probe position errors to the signal detected by the probe; and a compensator compensating for the probe position errors detected by the error detector.

The error detector may comprise: a multiplier multiplying the signal detected by the probe with a predetermined error extracting signal used to extract the probe position errors; and an integrator integrating output signals of the multiplier in units of a period of the error extracting signal.

According to another aspect of the present invention, there is provided a method of detecting a probe position error in a data storage system having a data storage medium and a probe for detecting signals by scanning the data storage medium, comprising: extracting probe position errors from signals detected by the probe; and integrating the probe position errors in units of a predetermined time. The extracting of the probe position errors may be performed by multiplying the signal detected by the probe with a predetermined error extracting signal used to extract the probe position errors. The extracting of the probe position errors may comprise: multiplying the signal detected by the probe with the horizontal error extracting signal; and multiplying the signal detected by the probe with the vertical error extracting signal, and the integrating of the probe position error may comprises: integrating a multiplication value of the horizontal error extracting signal for a predetermined time; and integrating a multiplication value of the vertical error extracting signal for a predetermined time.

According to another aspect of the present invention, there is provided a method of tracking data in a data storage system having a data storage medium and a probe for detecting signals by scanning the data storage medium, comprising: detecting the signals from the data storage medium by using the probe; detecting probe position errors from the signals detected by the probe; and compensating for the probe position errors. The detecting of the probe position errors may comprise: extracting the probe position errors by applying a predetermined error extracting signal to the signals detected by the probe; and integrating the extracted probe position errors for a predetermined time.

According to another aspect of the present invention, there is provided an apparatus for detecting a probe position error in a data storage system having a data storage medium and a probe for detecting signals by scanning the data storage medium, comprising: a position error extracting unit extracting probe position errors from signals detected by the probe; a position error adding unit calculating the probe position errors in units of a predetermined time; and a signal processing unit storing a past probe position error added by the position error extracting unit and generating a probe position error by processing the past probe position error and a current probe position error. The position error extracting unit may be constructed with a multiplier multiplying the signal detected by the probe with a predetermined error extracting signal used to extract the probe position errors, and the position error adding unit may be constructed with an integrator integrating output signals of the multiplier in units of a half period of the error extracting signal. The signal processing unit may comprise: a position error storing unit storing a past half-period probe position error added by the position error adding unit; a synchronization error generating unit generating a horizontal probe position error by adding the past half-period probe position error stored in the position error storing unit with a current half-period probe position error added by the position error adding unit; and a track error generating unit generating a vertical probe position error by using a difference between a current half-period probe position error added by the position error adding unit and the past half-period probe position error stored in the position error storing unit. The vertical position error may be generated by subtracting the current half-period probe position error added by the position error adding unit from the past half-period probe position error stored in the position error storing unit, in a case where a vertical component of vibration of the probe on the data storage medium increases, and by subtracting the past half-period probe position error stored in the position error storing unit from the current half-period probe position error added by the position error adding unit, in a case where a vertical component of vibration of the probe on the data storage medium decreases.

According to another aspect of the present invention, there is provided an apparatus for tracking data in a data storage system having a data storage medium and a probe for detecting signals by scanning the data storage medium, comprising: a scanner moving the data storage medium; a probe detecting the signals from the data storage medium; an error detector detecting probe position errors in a half-period of a predetermined error extracting signal by applying the predetermined error extracting signal used to extract the probe position errors to the signal detected by the probe; and a compensator compensating for the probe position errors detected by the error detector. The error detector may comprise: a multiplier multiplying the signal detected by the probe with a predetermined error extracting signal used to extract the probe position errors; an integrator integrating output signals of the multiplier in units of a half period of the error extracting signal; and a signal processing unit storing a past half-period position error integrated by the integrator and generating a probe position error by processing the past half-period position error and a current half-period position error. The signal processing unit may comprise: a position error storing unit storing a past half-period probe position error added by the position error adding unit; a synchronization error generating unit generating a horizontal probe position error by adding the past half-period probe position error stored in the position error storing unit with a current half-period probe position error added by the position error adding unit; and a track error generating unit generating a vertical probe position error by using a difference between a current half-period probe position error added by the position error adding unit and the past half-period probe position error stored in the position error storing unit.

According to another aspect of the present invention, there is provided a method of detecting a probe position error in a data storage system having a data storage medium and a probe for detecting signals by scanning the data storage medium, comprising: extracting probe position errors from signals detected by the probe; integrating the probe position errors in units of a predetermined time; and generating a probe position error by processing a current integrated probe position error and a past integrated probe position error. The extracting of the probe position errors may be performed by multiplying the signal detected by the probe with a predetermined error extracting signal used to extract the probe position errors. The generating of the probe position error may comprise: generating a horizontal probe position error (a synchronization error) by adding the past half-period probe position error stored in the position error storing unit with a current half-period probe position error added by the position error adding unit; and generating a vertical probe position error (a track error) by using a difference between a current half-period probe position error added by the position error adding unit and the past half-period probe position error stored in the position error storing unit.

According to another aspect of the present invention, there is provided a method of tracking data in a data storage system having a data storage medium and a probe for detecting signals by scanning the data storage medium, comprising: detecting the signals from the data storage medium by using the probe; extracting the probe position errors by applying a predetermined error extracting signal to the signals detected by the probe; integrating the extracted probe position errors for a predetermined time; generating a probe position error by process g a current integrated current position error and a past integrated probe position error; and compensating for the probe position error. The predetermined time may be a half period of the error extracting signal.

According to another aspect of the present invention, there is provided a computer-readable medium storing a program executed by a computer, wherein the program performs the method according to the aforementioned aspects of the present invention.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1A:
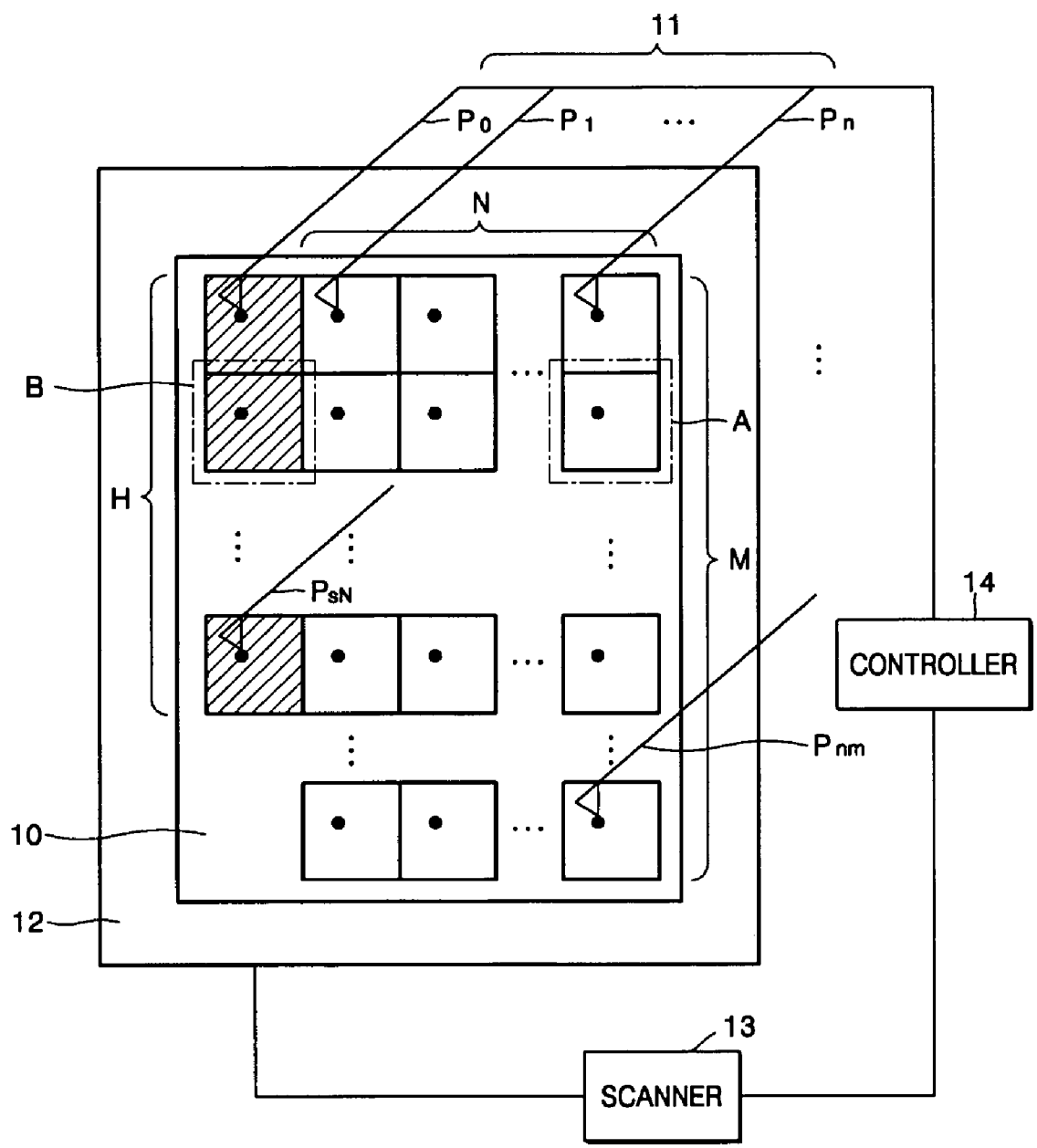
FIG. 1A is a view showing a data storage apparatus.

The present invention and operational advantages thereof can be fully understood by referring to the accompanying drawings and explanations thereof. Exemplary embodiments of the present invention will be described with reference to the accompanying drawings to explain the present invention in detail. In the drawings, the same reference numerals indicate the same elements.

A probe position error detecting apparatus and method used for a data storage system and a data tracking apparatus and method of a data storage system using the probe position error detecting apparatus and method according to an exemplary embodiment of the present invention will now be described with reference to the accompanying drawings.

FIG. 1A is a view showing a data storage apparatus. The data storage system comprises a data storage medium 10 and a probe 11 for detecting signals by scanning the data storage medium 10. More specifically, the probe 11 comprises a plurality of tips for reading and writing data on the data storage medium 10. The data storage medium 10 is mounted on a stage 12 which is driven with a control signal of a control unit 14.

As shown in FIG. 1A, the data storage medium 10 is portioned into N×M data regions A and H servo regions B. Data is recorded on the data regions A, and position information of the data regions A is recorded on the servo regions B. N×M probes are provided for the N×M data regions; and H probes are provided for the H servo regions. The probe 11 comprises tips contacting with or being in a close proximity to the surface of the data storage medium 10 and cantilevers supporting the tips.

Figure 1B:
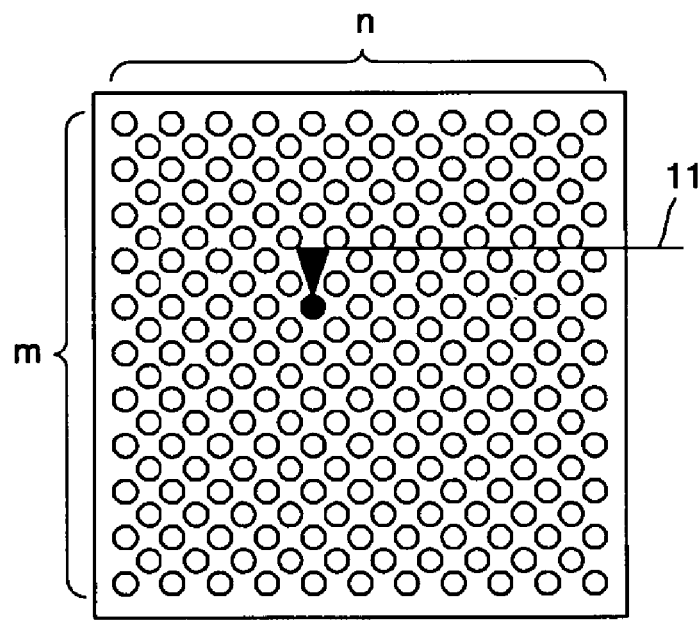
FIG. 1B is a view showing a data region A of FIG. 1A.
Figure 1C:
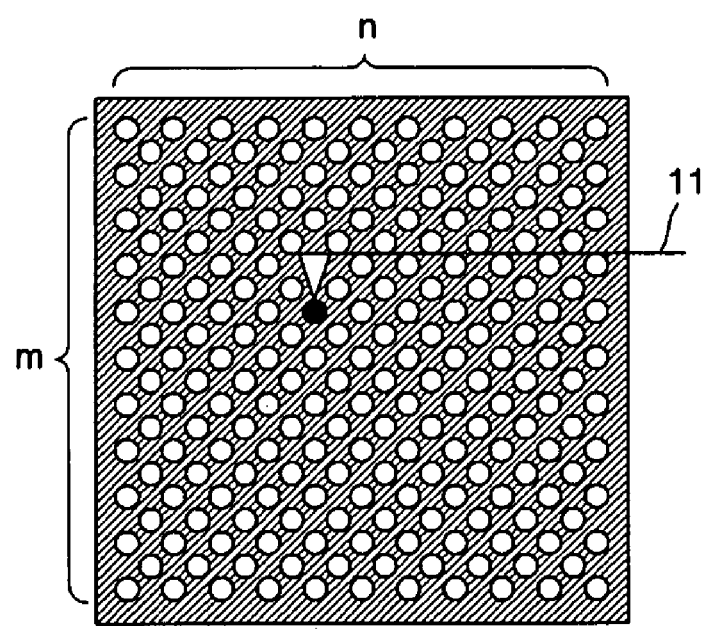
FIG. 1C is a view showing a servo region B of FIG. 1A.
Figure 1D:
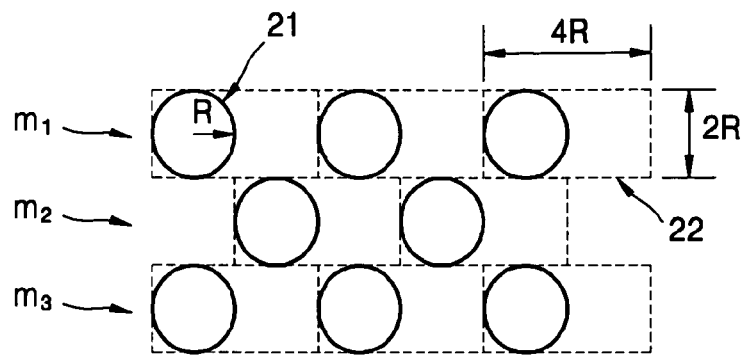
FIG. 1D is a view showing unit cells of three data columns m1, m2, and m3.

FIG. 1B is a view showing a data region A of FIG. 1A, and FIG. 1C is a view showing a servo region B of FIG. 1A. Each data region A comprises n×m data unit cells. Each servo data region B comprises n×m servo unit cells. The probe 11 moves over the data and servo unit cells to read and write the data or the position information. FIG. 1D is a view showing unit cells 22 of three data columns m1, m2, and m3. One unit cell 22 includes one data pit 21 representing 0 or 1. The data pit 21 has a radius R. It is assumed that the size of the unit cell 22 is 4 R×2 R (horizontal×vertical). As shown in FIG. 1D, data pits of the adjacent data columns (m1 and m2, or m2 and m3) are disposed at locations having a phase difference of 180°.

Figure 2:
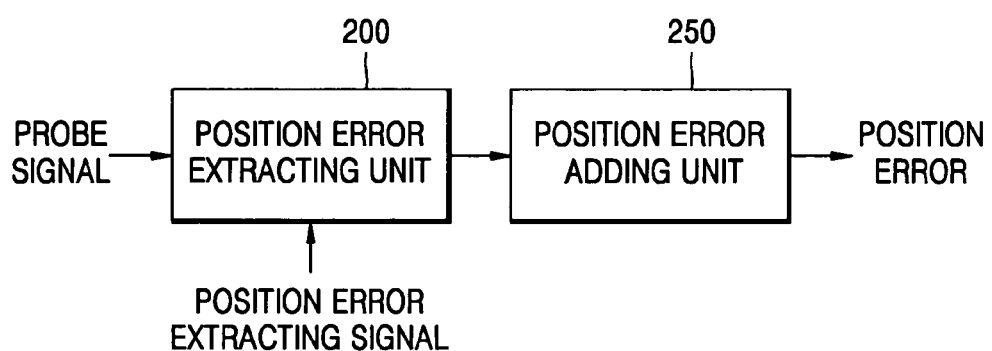
FIG. 2 is a block diagram showing a probe position error detecting apparatus used for a data storage system using a probe according to an exemplary embodiment of the present invention.

FIG. 2 is a block diagram showing a probe position error detecting apparatus used for a data storage system using a probe according to an exemplary embodiment of the present invention. The probe position error detecting apparatus comprises a position error extracting unit 200 and a position error adding unit 250. The position error extracting unit 200 extracts probe position errors from signals detected by the probe 11. The position error extracting unit 200 may be constructed with a multiplier for multiplying the signal detected by the probe with a predetermined error extracting signal used to extract the probe position errors. The position error adding unit 250 adds the probe position errors in units of a predetermined time. The position error adding unit 250 may be constructed with an integrator integrating output signals of the multiplier in units of a period of the error extracting signal.

The error extracting signal may be a square wave having a predetermined period and a duty cycle of 50%. The period of the error extracting signal is determined with a ratio of a distance between data pits on the data storage medium 10 and a scanning velocity of the probe 11.

In a case where a synchronization error and a track error are used as the probe position error, the error extracting signal is classified into a signal (a horizontal error extracting signal) used to extract the synchronization error and a signal (a vertical error extracting signal) used to extract the track error. Here the synchronization and track errors are horizontal and vertical components of the position error, respectively. The horizontal error extracting signal is a square wave having a period determined with a ratio of a distance between data pits on the data storage medium 10 and a scanning velocity of the probe 11 and a duty cycle of 50%. The vertical error extracting signal is a square wave having a period twice the period of the horizontal extracting signal and being synchronized with the horizontal extracting signal.

The multiplier comprises: a horizontal multiplier for multiplying the signal detected by the probe with the horizontal error extracting signal; and a vertical multiplier multiplying the signal detected by the probe with the vertical error extracting signal. In addition, the integrator comprises: a horizontal integrator integrating output signals of the horizontal multiplier; and vertical integrator for integrating output signals of the vertical multiplier.

Figure 3:
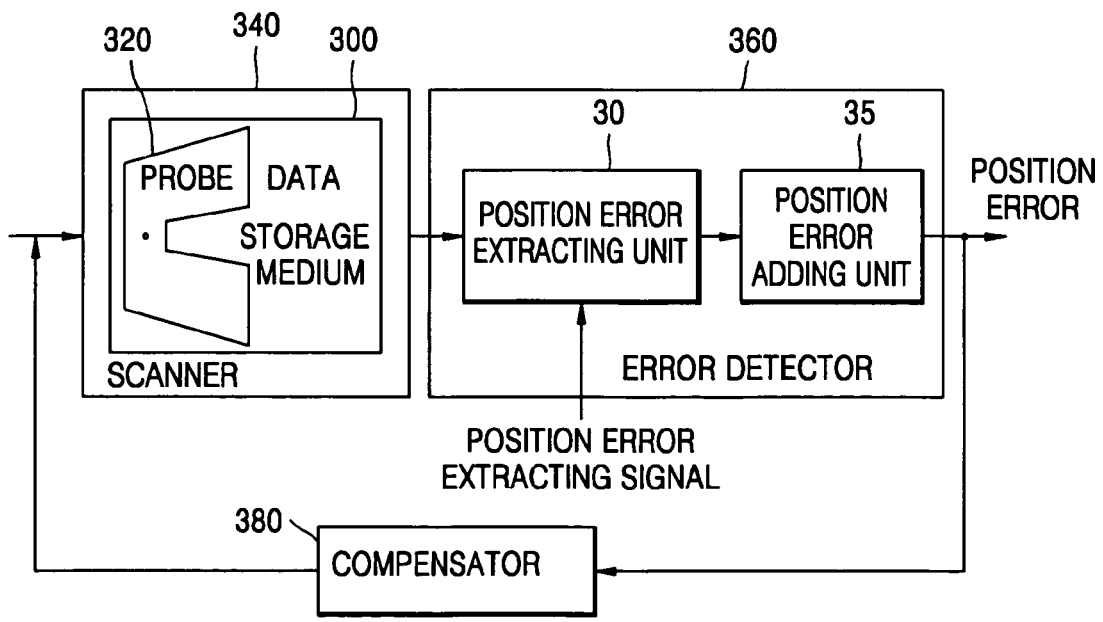
FIG. 3 is a block diagram showing a data tracking apparatus of a data storage system using a probe position error detecting apparatus according to an exemplary embodiment of the present invention.

FIG. 3 is a block diagram showing a data tracking apparatus of a data storage system using a probe position error detecting apparatus according to an exemplary embodiment of the present invention. The data tracking apparatus comprises a data storage medium 300, a probe 320, a scanner 340, an error detector 360, and a compensator 380. The scanner 340 has a function of moving the data storage medium 300. The scanner 340 may be referred to as an "XY stage." The probe 320 detects signals (data pits) from the data storage medium 300.

The error detector 360 detects probe position errors by applying a predetermined error extracting signal used to extract the probe position errors to a signal detected by the probe 320. The aforementioned probe position error detecting apparatus is an error detector 360. The error detector 360 comprises a multiplier 30 and an integrator 35.

The compensator 380 compensates for the probe position errors detected by the error detector 360.

Figure 4:
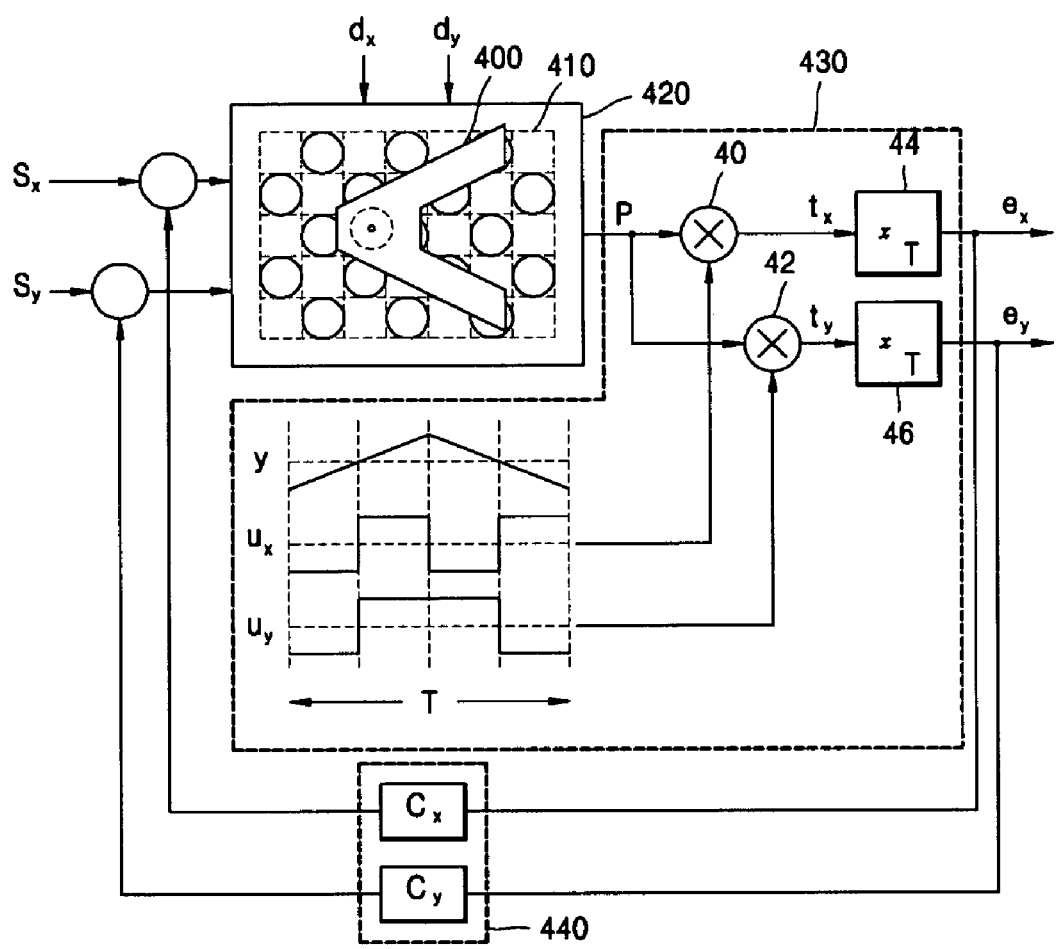
FIG. 4 is a view showing the data tracking apparatus of FIG. 3 in detail.

FIG. 4 is a view showing the data tracking apparatus of FIG. 3 in detail. The data tracking apparatus in a data storage system comprises a data storage medium 410, a probe 400 for reading and writing data on the data storage medium 410, a scanner 420 for moving the data storage medium 410, an error detector 430 for detecting an error component in a scanning direction (an x direction) and an error component in a direction (a y direction) perpendicular to the scanning direction from a data reproducing signal, and a compensator 440 for compensating for the error.

While moved by the scanner 420, the probe 400 reads and writes data on the data storage medium 410. The error detector 430 detects a synchronization error corresponding to the error component in the scanning direction (the x direction) and a track error corresponding to the error component in the direction (the y direction) perpendicular to the scanning direction. The compensator 440 compensates for the synchronization and track errors.

The error detector 430 comprises a horizontal multiplier 40, a vertical multiplier 42, a horizontal integrator 44, and a vertical integrator 46. The horizontal multiplier 40 multiplies the signal p detected by the probe 400 with a horizontal error extracting signal $u_x$. The vertical multiplier 42 multiplies the signal p detected by the probe 400 with the vertical error extracting signal $u_y$. The horizontal integrator 44 integrates an output signal $t_x$ of the horizontal multiplier 40 for one period T to generate the synchronization error $e_x$. The vertical integrator 46 integrates an output signal $t_y$ of the vertical multiplier 42 for one period T to generate the track error $e_y$.

Figure 6:
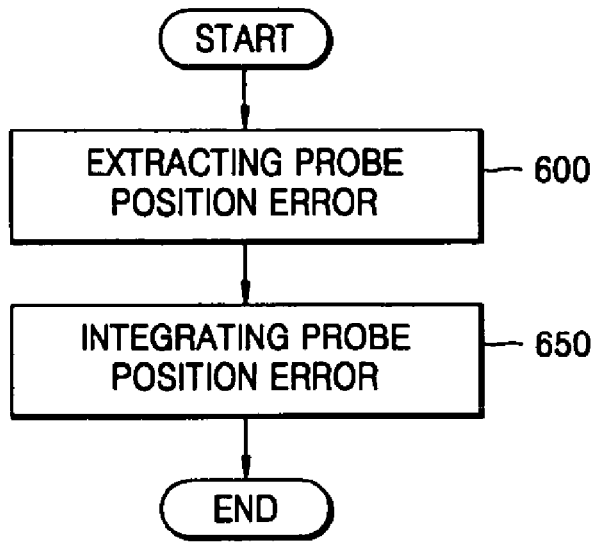
FIG. 6 is a flowchart showing a probe position error detecting method used for a data storage system using a probe according to an exemplary embodiment of the present invention.
Figure 7:
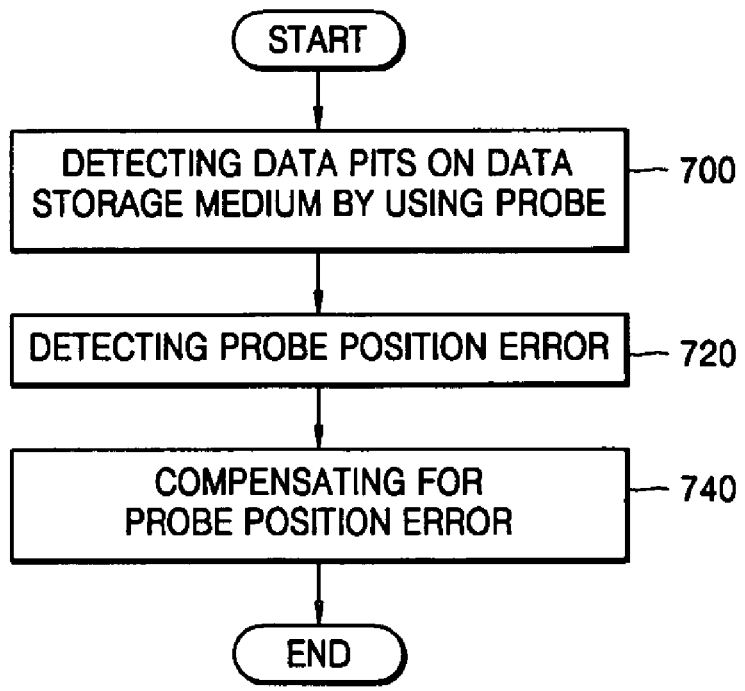
FIG. 7 is a flowchart showing a data tracking method of a data storage system using a probe position error detecting apparatus according to an exemplary embodiment of the present invention.

FIGS. 5A to 5E are timing diagrams showing timings of signals of FIG. 4. FIG. 6 is a flowchart showing a probe position error detecting method used for a data storage system using a probe according to an exemplary embodiment of the present invention. FIG. 7 is a flowchart showing a data tracking method of a data storage system using a probe position error detecting apparatus according to an exemplary embodiment of the present invention.

Now, operations of the probe position error detecting method and the data tracking method will be described with reference to FIGS. 5A to 5E, 6 and 7.

Figure 5:
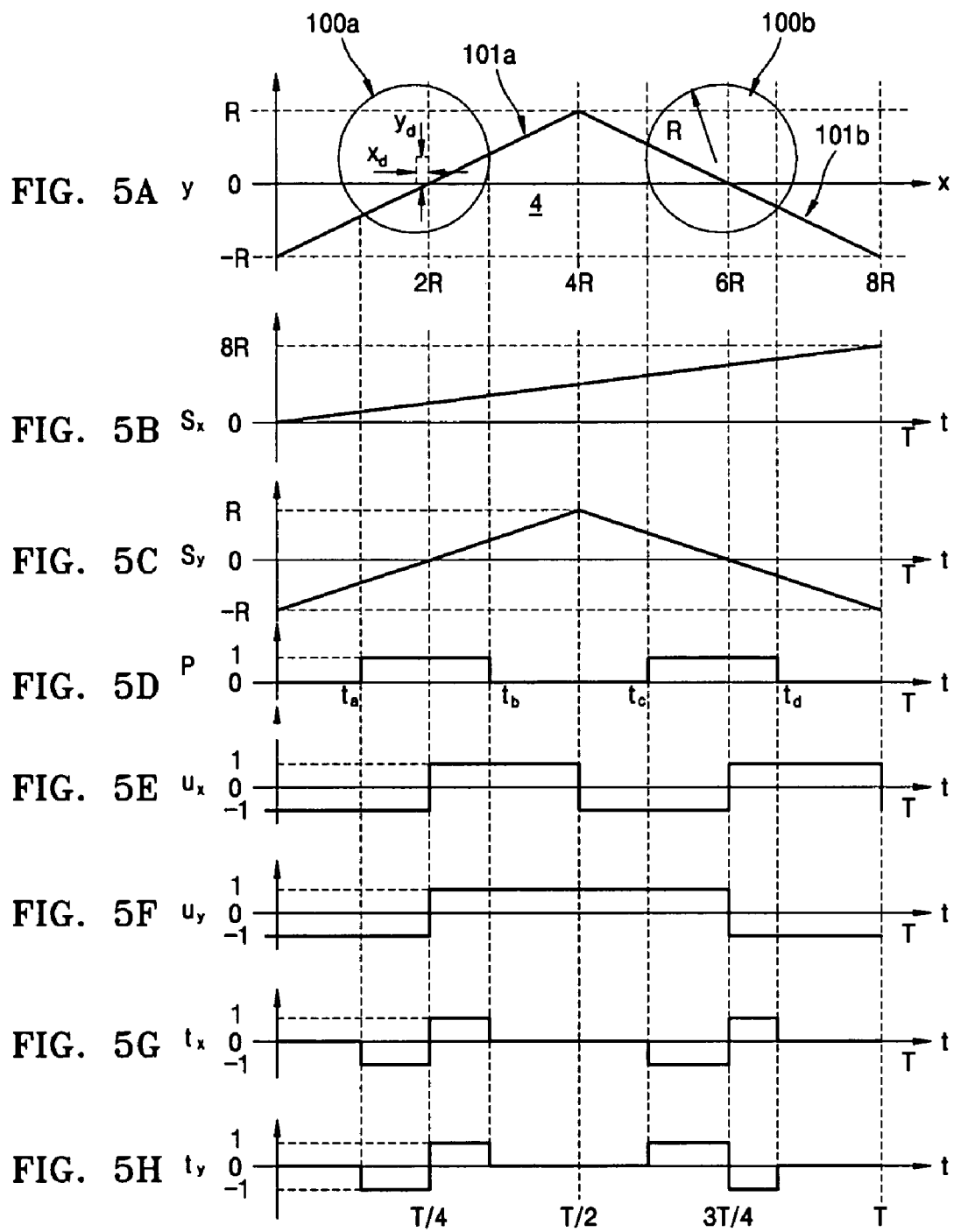
FIGS. 5A to 5H are timing diagrams showing timings of signals of FIG. 4.

The scanner 420 moves in the x direction (the scanning direction) at a constant velocity in accordance with a scanning signal $s_x$ shown in FIG. 5B. At the same time, the probe 400 vibrates in the y direction in accordance with a vibrating signal $s_y$ shown in FIG. 5C. The vibrating signal $s_y$ is a triangular wave having a period T and a slope of 8 R/T. Here, R is a radius of a data pit. It is assumed that there is a disturbance having an x-axis component $d_x$ and a y-axis component $d_y$, and an error comprising an x-axis error $x_d$ and a y-axis error $y_d$ occurs due to the disturbance components $d_x$ and $d_y$ as shown in FIG. 5A.

The probe 400 detects data pits 100a and 100b on the data storage medium 410 while moving along the trajectories 101a and 101b shown in FIG. 5A in accordance with the scanning and vibrating signals $s_x$ and $s_y$ (Operation 700). If the probe 400 passes through the data pits 100a and 100b, ON pulses are generated. Otherwise, OFF pulses are generated. As a result, a reproducing signal p having ON and OFF pulses is generated as shown in FIG. 5D. Here, the amplitude of the reproducing signal p is assumed to be 1. After the data pits on the data storage medium 410 are detected, a probe position error is detected (Operation 720). Now, the detecting of the probe position error will be described in detail.

Referring to FIGS. 5A to 5D, the probe passes through the data pit 100a in a time interval $(t_a, t_b)$, and then, the data pit 100b in a time interval $(t_c, t_d)$ to generate the reproducing signal p. The error comprising the x-axis error $x_d$ and the y-axis error $y_d$ is extracted from the reproducing signal p (Operation 600). As described above, the x-axis error $x_d$ and the y-axis error $y_d$ are the synchronization error $e_x$ and the track error $e_y$, respectively.

More specifically, in order to extract the synchronization error $e_x$ and the track error $e_y$, error extracting signals $u_x$ and $u_y$ shown in FIGS. 5E and 5F are generated. The error extracting signals $u_x$ and $u_y$ are associated with the trajectory y (100a and 100b) of the probe 400 and has amplitude of 1. Next, in the horizontal and vertical multipliers 40 and 42, output signals $t_x$ and $t_y$ are generated by multiplying the reproducing signal p with the horizontal and vertical error extracting signals $u_x$ and $u_y$ by using Equations 1 and 2, respectively.

$$t_x = u_x \times p \qquad \text{[Equation 1]}$$

$$t_y = u_y \times p \qquad \text{[Equation 2]}$$

Next, the horizontal and vertical integrators 44 and 46 integrate the output signals $t_x$ and $t_y$ of the horizontal and vertical multipliers 40 and 42 for one period T (Operation 650) by using Equations 3 and 4, respectively. As a result, the synchronization error $e_x$ and the track error $e_y$ due to x and y axis components $d_x$ and $d_y$ of the disturbance are extracted.

$$e_x = \int_T t_x \, dt = -\int_a^{T/4} t_x \, dt + \int_{T/4}^{t_b} t_x \, dt - \qquad \text{[Equation 3]}$$
$$\int_c^{3T/4} t_x \, dt + \int_{3T/4}^{t_d} t_x \, dt = (2T/5R)x_d$$

$$e_y = \int_T t_y \, dt = -\int_a^{T/4} t_x \, dt + \int_{T/4}^{t_b} t_y \, dt + \qquad \text{[Equation 4]}$$
$$\int_{t_c}^{3T/4} t_y \, dt - \int_{3T/4}^{t_d} t_y \, dt = (T/5R)y_d$$

It can be understood from Equations 3 and 4 that the synchronization error $e_x$ and the track error $e_y$ are linear functions of only the x-axis error $x_d$ and the y-axis error $y_d$, respectively.

Figure 8A:
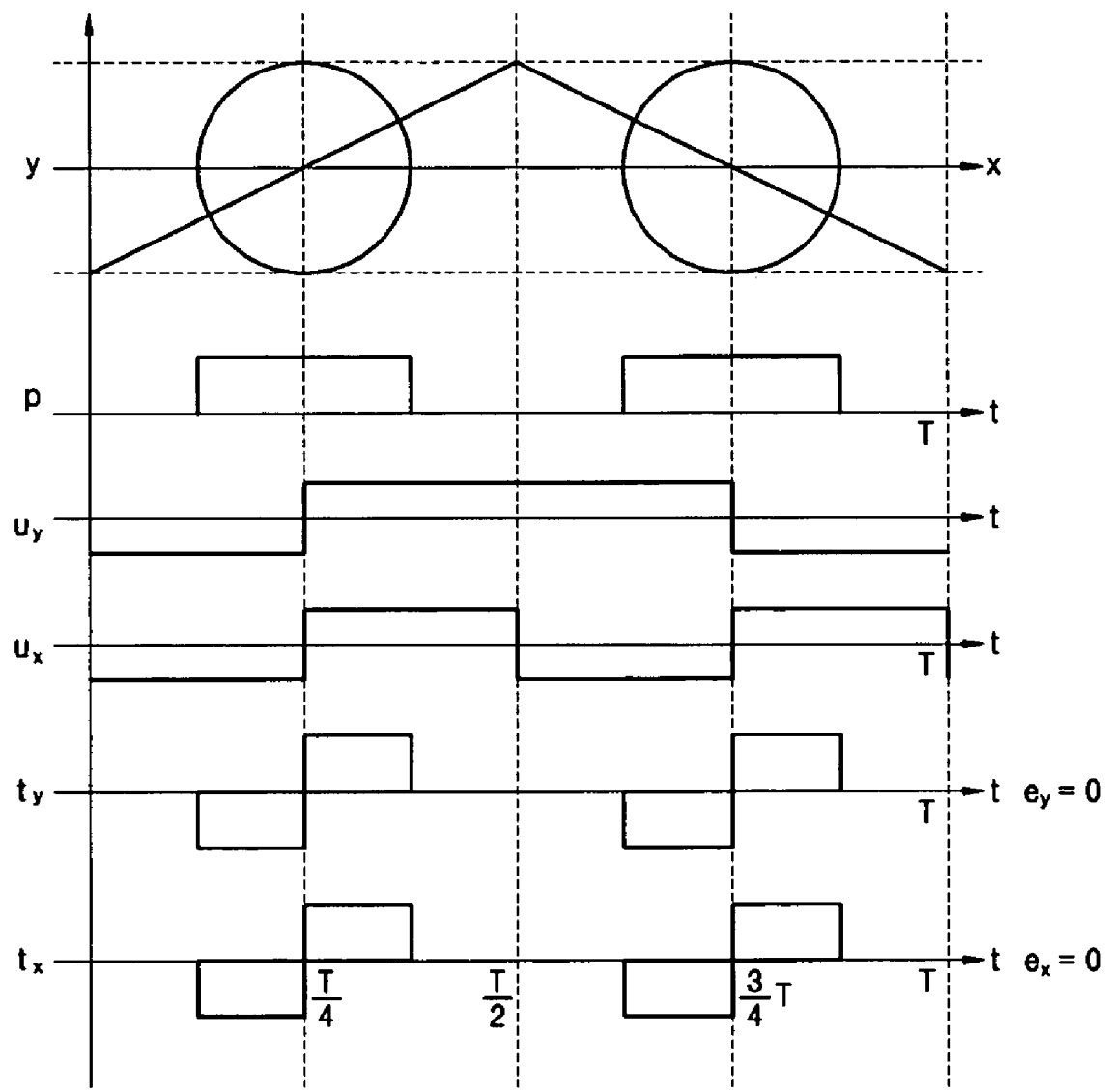
FIG. 8A is a timing diagram showing timings of signals in a case where a synchronization error $e_x$ and an track error $e_y$ are zero.
Figure 8B:
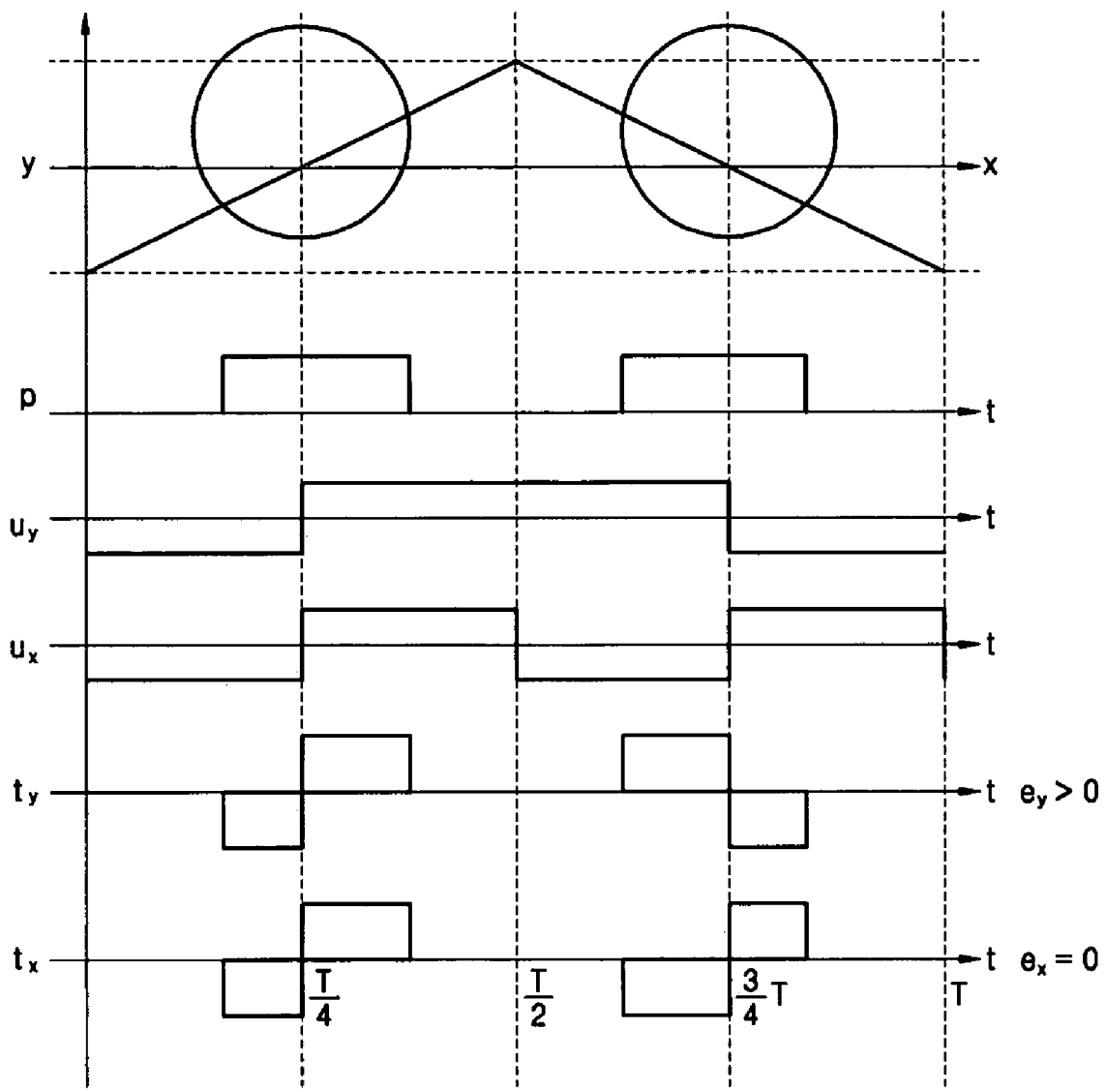
FIG. 8B is a timing diagram showing timings of signals in a case where a synchronization error $e_x$ is zero and an track error $e_y$ are positive.
Figure 8C:
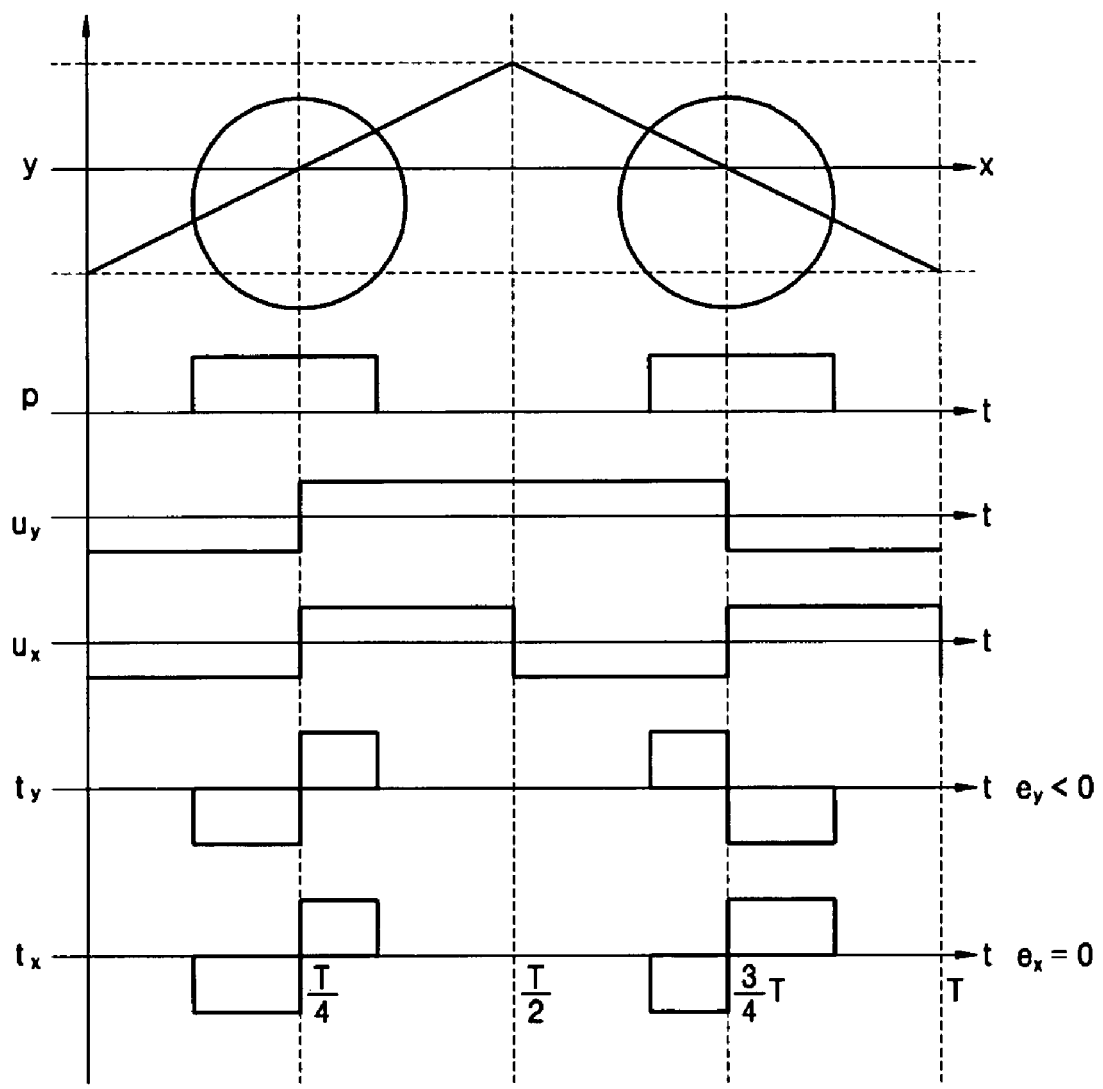
FIG. 8C is a timing diagram showing timings of signals in a case where a synchronization error $e_x$ is zero and an track error $e_y$ is negative.
Figure 8D:
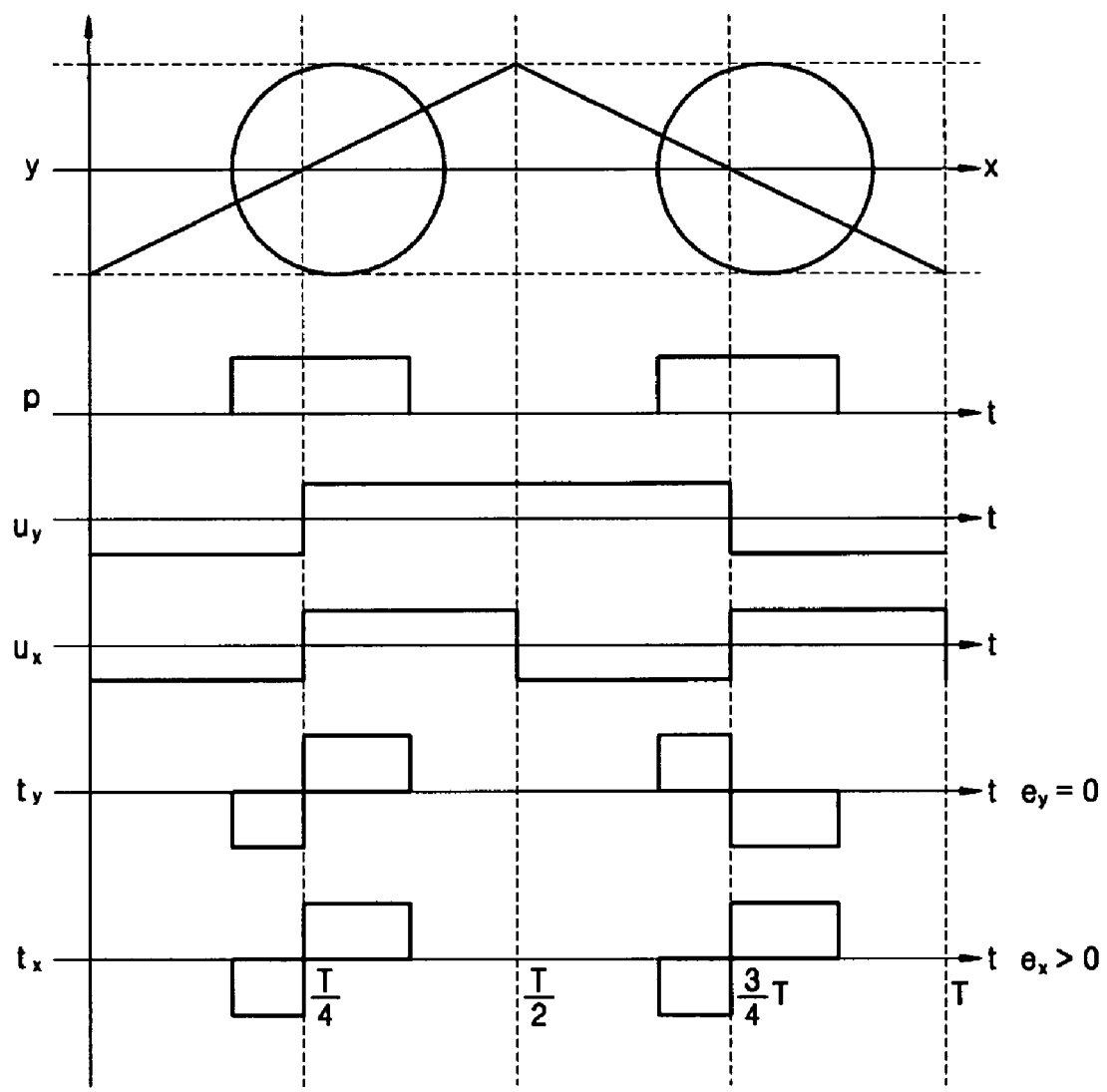
FIG. 8D is a timing diagram showing timings of signals in a case where a synchronization error $e_x$ is positive and an track error $e_y$ is zero.
Figure 8E:
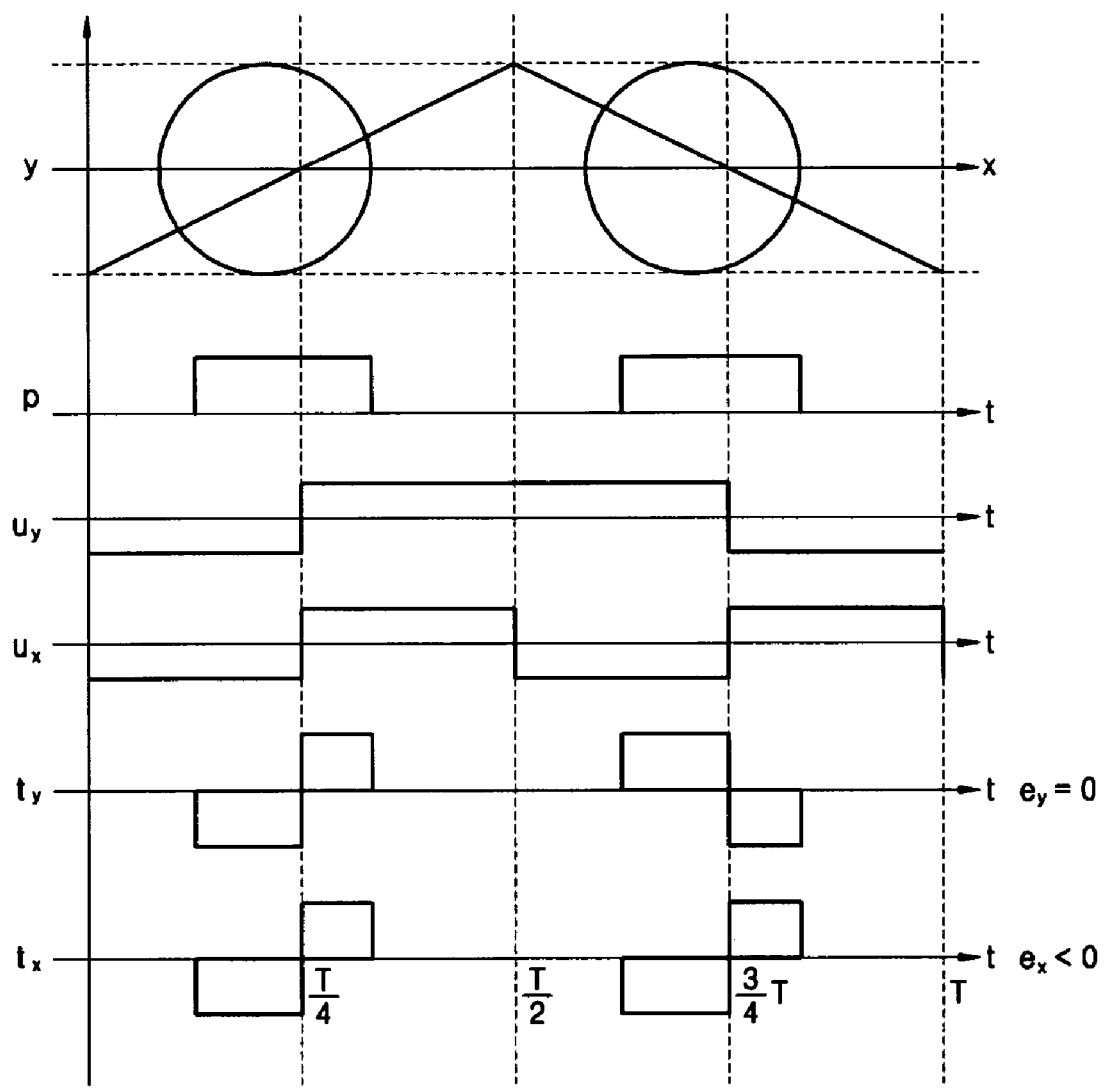
FIG. 8E is a timing diagram showing timings of signals in a case where a synchronization error $e_x$ is negative and an track error $e_y$ is zero.

FIG. 8A is a timing diagram showing timings of signals in a case where the synchronization error $e_x$ and the track error $e_y$ are zero. FIG. 8B is a timing diagram showing timings of signals in a case where the synchronization error $e_x$ is zero and the track error $e_y$ is positive. FIG. 8C is a timing diagram showing timings of signals in a case where a synchronization error $e_x$ is zero and a track error $e_y$ is negative. FIG. 8D is a timing diagram showing timings of signals in a case where a synchronization error $e_x$ is positive and a track error $e_y$ is zero. FIG. 8E is a timing diagram showing timings of signals in a case where an synchronization error $e_x$ is zero and an track error $e_y$ is negative.

The synchronization error $e_x$ and the track error $e_y$ is removed by using the compensator 440 (Operation 740).

On the other hand, the probe position error tracking method according to the present invention can be applied to compensation of a synchronization error in a case where there is no vibration in the direction perpendicular to the scanning direction. In this case, the vibrating signal $s_y$ and the vertical error extracting signal $u_y$ are zero, and thus, the output signal $t_y$ and track error $e_y$ are zero.

Figure 9:
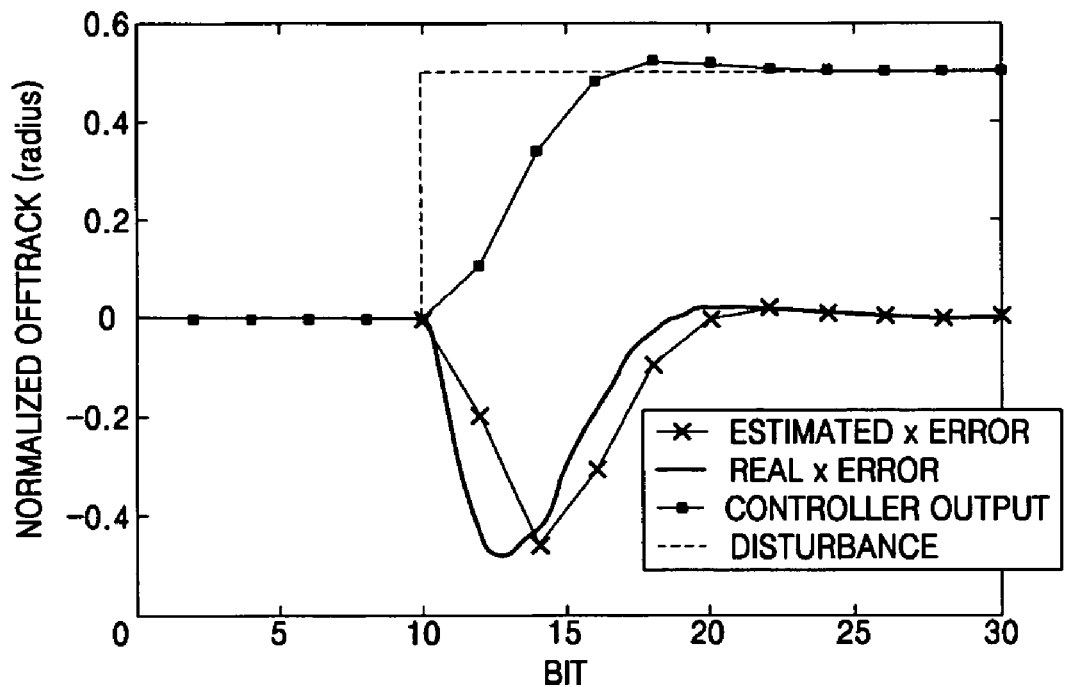
FIG. 9 is a graph showing a result of simulation of compensating for a synchronization error according to an exemplary embodiment of the present invention when a disturbance of 0.5 R is exerted in a scanning direction.

FIG. 9 is a graph showing a result of simulation of compensating for a synchronization error according to an exemplary embodiment of the present invention when a disturbance of 0.5 R is exerted in the scanning direction.

Figure 10:
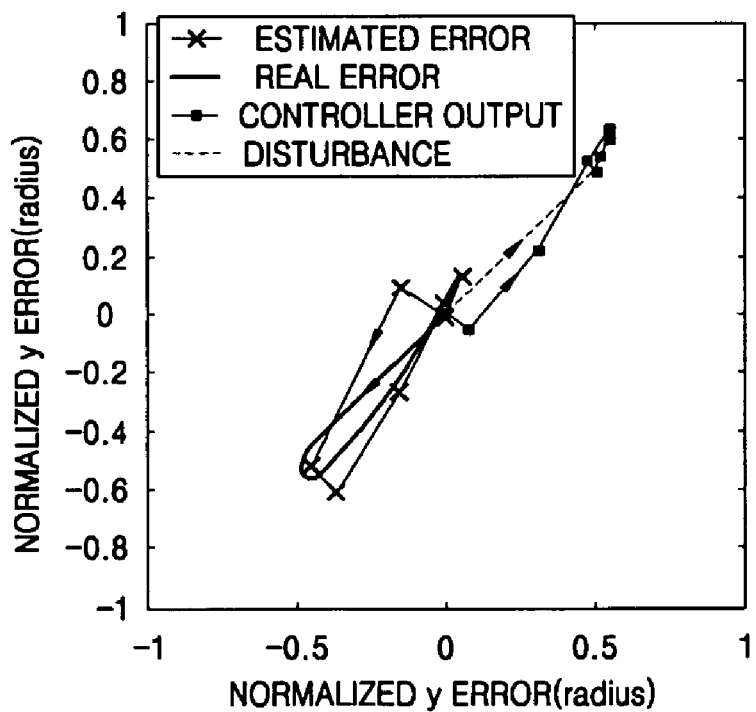
FIG. 10 is a graph showing a result of simulation of compensating for a synchronization error and a track error according to an exemplary embodiment of the present invention when a disturbance of 0.5 R is exerted in a scanning direction and a disturbance of 0.5 R is exerted in a direction perpendicular to the scanning direction.

It can be understood from FIG. 9 that the synchronization error $e_x$ due to the disturbance is removed by the compensator. FIG. 10 is a graph showing a result of simulation of compensating for a synchronization error and a track error according to an exemplary embodiment of the present invention when a disturbance of 0.5 R is exerted in a scanning direction and a disturbance of 0.5 R is exerted in a direction perpendicular to the scanning direction. Similarly, It can be understood from FIG. 10 that the track error $e_y$ due to the disturbance is removed by the compensator.

A probe position error detecting apparatus and method used for a data storage system and a data tracking apparatus and method of a data storage system using the probe position error detecting apparatus and method according to another exemplary embodiment of the present invention will now be described with reference to the accompanying drawings.

Figure 11:
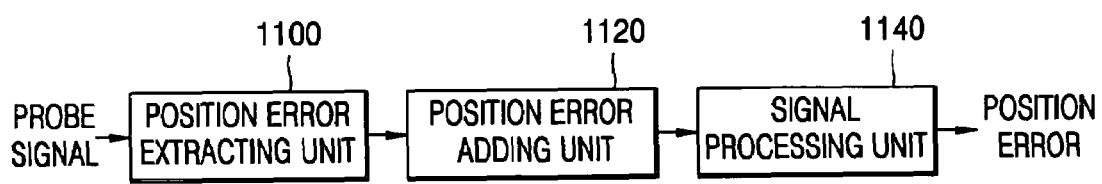
FIG. 11 is a block diagram showing a probe position error detecting apparatus used for a data storage system using a probe according to another exemplary embodiment of the present invention.

FIG. 11 is a block diagram showing a probe position error detecting apparatus used for a data storage system using a probe according to another exemplary embodiment of the present invention. The probe position error detecting apparatus comprises a position error extracting unit 1100, a position error adding unit 1120, and a signal processing unit 1140. The position error extracting unit 1100 extracts probe position errors from signals detected by the probe. The position error extracting unit 1100 may be constructed with a multiplier multiplying the signal detected by the probe with a predetermined error extracting signal used to extract the probe position errors. The position error adding unit 1120 adds the probe position errors in units of a predetermined time. The position error adding unit 1120 is constructed with an integrator integrating output signals of the multiplier in units of a half period (T/2) of the error extracting signal.

The error extracting signal may be a square wave having a predetermined period and a duty cycle of 50%. The period of the error extracting signal is determined with a ratio of a distance between data pits on the data storage medium and a scanning velocity of the probe The signal processing unit 1140 stores a past probe position error added by the position error extracting unit 1100 and generates a probe position error by processing the past probe position error and a current probe position error.

The signal processing unit 1140 comprises a position error storing unit 1200, a synchronization error generating unit 1220, and a track error generating unit 1240.

The position error storing unit 1200 stores a past half-period probe position error added by the position error adding unit 1120.

The synchronization error generating unit 1220 generates a horizontal probe position error by adding the past half-period probe position error stored in the position error storing unit 1200 with a current half-period probe position error added by the position error adding unit 1120.

The track error generating unit 1240 generates a vertical probe position error by using a difference between a current half-period probe position error added by the position error adding unit 1120 and the past half-period probe position error stored in the position error storing unit 1200. The vertical position error is generated by subtracting the current half-period probe position error added by the position error adding unit 1120 from the past half-period probe position error stored in the position error storing unit 1200, in a case where a vertical component of vibration of the probe on the data storage medium increases, and by subtracting the past half-period probe position error stored in the position error storing unit 1200 from the current half-period probe position error added by the position error adding unit 1120, in a case where a vertical component of vibration of the probe on the data storage medium decreases in accordance with Equations 5 and 6, respectively.

$$e_x(k) = e_z(k) + e_z(k-1) \qquad \text{[Equation 5]}$$

$$e_y(k) = (-1)^k [e_z(k) + e_z(k-1)] \qquad \text{[Equation 6]}$$

Figure 13:
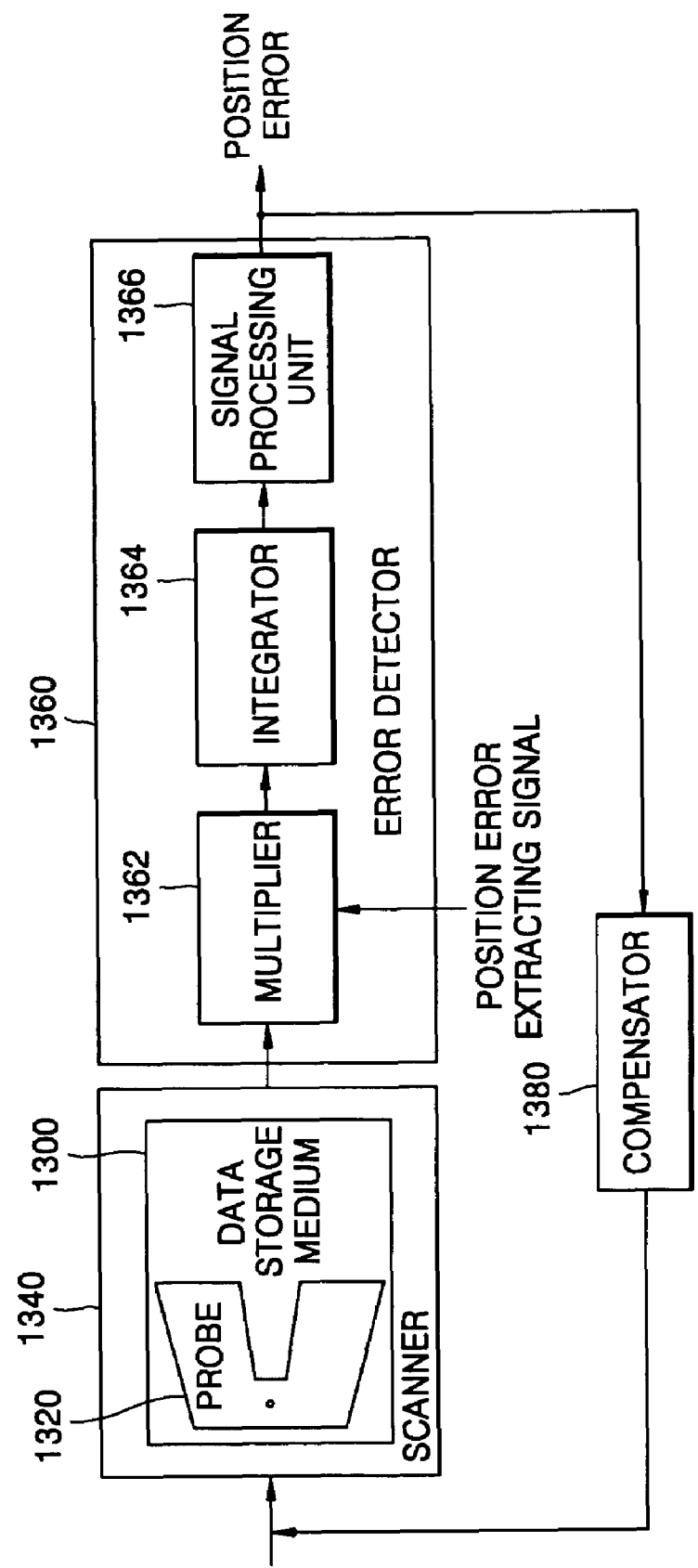
FIG. 13 is a block diagram showing a data tracking apparatus of a data storage system using a probe position error detecting apparatus.

FIG. 13 is a block diagram showing a data tracking apparatus of a data storage system using a probe position error detecting apparatus according to another exemplary embodiment of the present invention. The data tracking apparatus comprises a data storage medium 1300, a probe 1320, a scanner 1340, an error detector 1360, and a compensator 1380.

The scanner 1340 has a function of moving the data storage medium 1300. The scanner 1340 is sometimes referred to as an "XY stage." The probe 1320 detects signals (data pits) from the data storage medium 300.

The error detector 1360 detects probe position errors by applying a predetermined error extracting signal used to extract the probe position errors to a signal detected by the probe 1320. The probe position error detecting apparatus shown in FIG. 11 is an error detector 1360. The error detector 1360 comprises a multiplier 1362, an integrator 1364, and a signal processing unit 1366.

The compensator 1380 compensates for the probe position errors detected by the error detector 1360.

Figure 14:
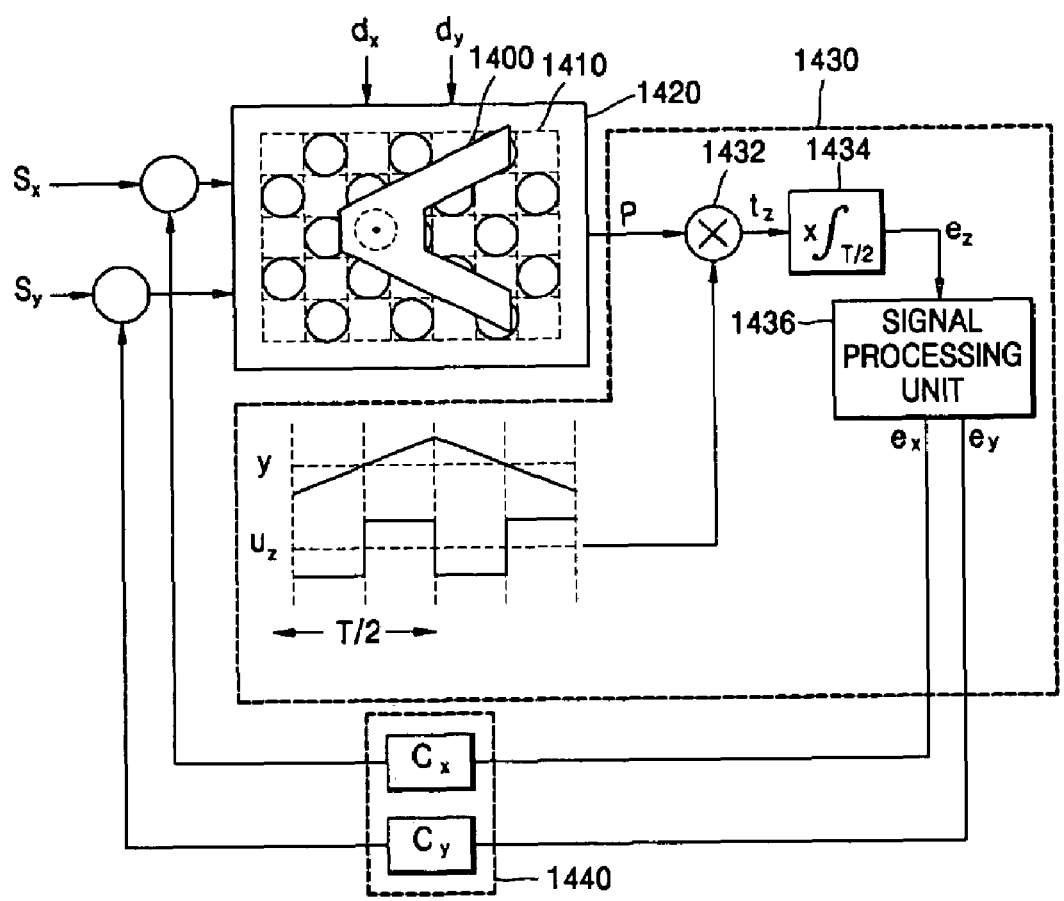
FIG. 14 is a view showing the data tracking apparatus of FIG. 13 in detail.

FIG. 14 is a view showing the data tracking apparatus of FIG. 13 in detail. The data tracking apparatus in a data storage system comprises a data storage medium 1410, a probe 1400 for reading and writing data on the data storage medium 1410, a scanner 1420 for moving the data storage medium 1410, an error detector 1430 for detecting an error component in a scanning direction (an x direction) and an error component in a direction (a y direction) perpendicular to the scanning direction from a data reproducing signal, and a compensator 1440 for compensating for the error.

While moved by the scanner 1420, the probe 1400 reads and writes data on the data storage medium 1410. The error detector 1430 detects a synchronization error corresponding to the error component in the scanning direction (the x direction) and a track error corresponding to the error component in the direction (the y direction) perpendicular to the scanning direction. The compensator 1440 compensates for the synchronization and track errors.

The error detector 1430 comprises a multiplier 1432, an integrator 1434, and a signal processing unit 1436. The multiplier 1432 multiplies the signal detected by the probe 140 with a predetermined error extracting signal $u_z$ used to extract the probe position errors. The integrator 1434 integrates output signals of the multiplier 1432 in units of a half period of the error extracting signal $u_z$. The signal processing unit 1436 stores a past half-period position error integrated by the integrator 1434 and generates a probe position error by processing the past half-period position error and a current half-period position error.

Figure 12:
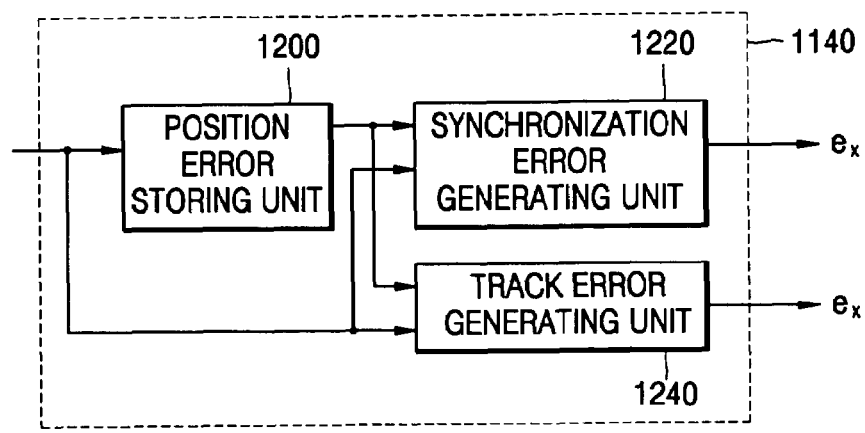
FIG. 12 is a block diagram showing a signal processing unit in detail.

As shown in FIG. 12, the signal processing unit 1436 comprises: a position error storing unit 1200 storing a past half-period probe position error added by the position error adding unit; a synchronization error generating unit 1220 generating a synchronization error $e_x$; and a track error generating unit 1240 generating a track error $e_y$. The compensator 1440 compensates for the synchronization error $e_x$; and the track error $e_y$ detected by the error detector 1430.

Figure 15:
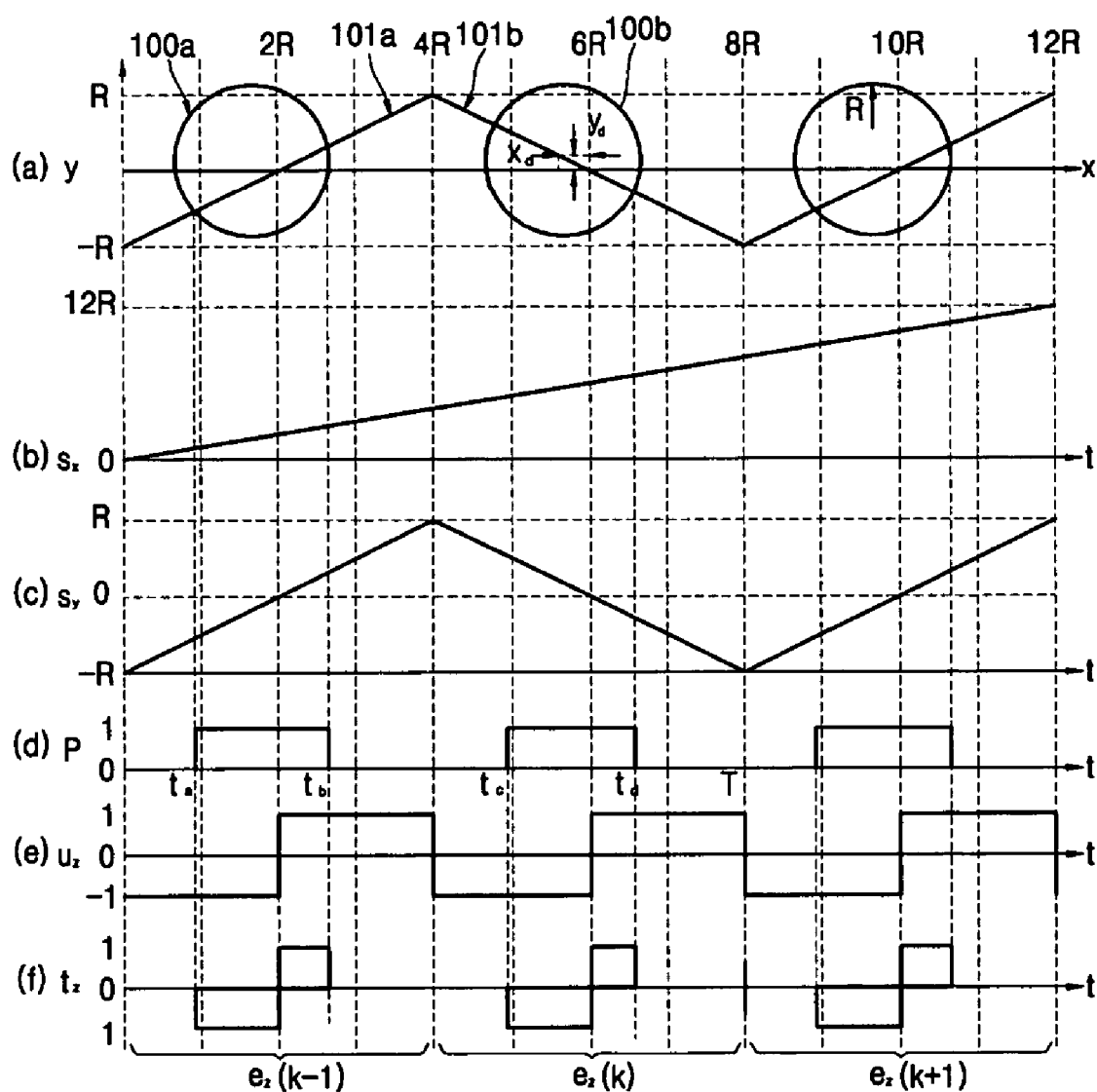
FIG. 15 is a timing diagram showing timings of signals of FIG. 14.
Figure 16:
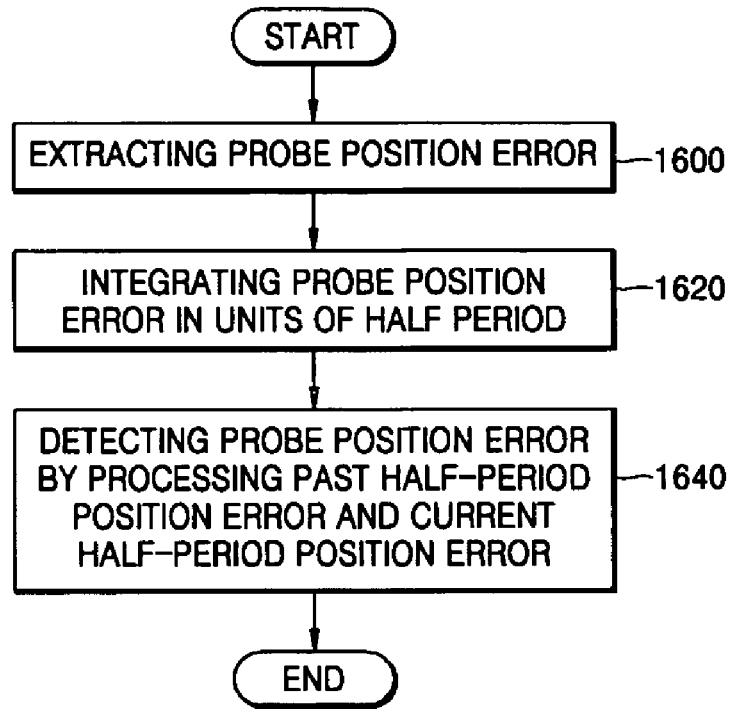
FIG. 16 is a flowchart showing a probe position error detecting method used for a data storage system using a probe according to another exemplary embodiment of the present invention.
Figure 17:
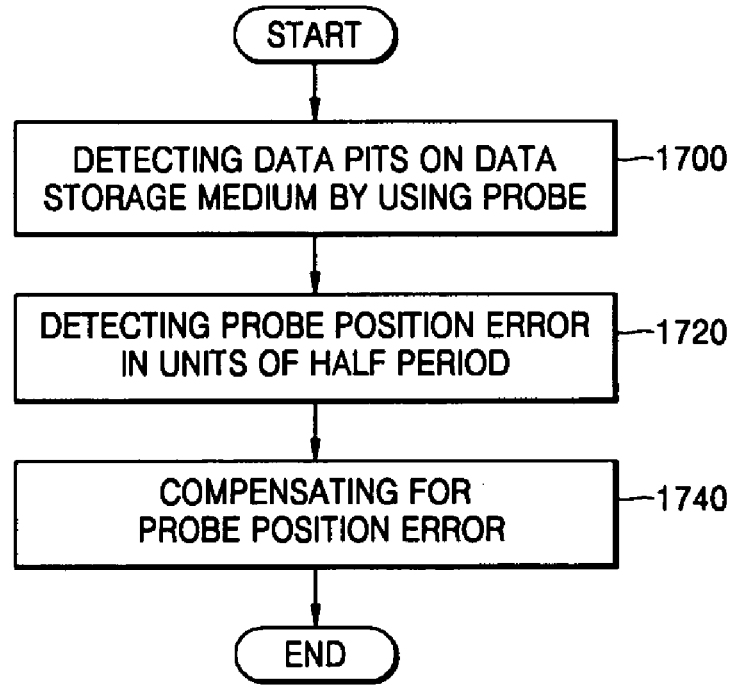
FIG. 17 is a flowchart showing a data tracking method of a data storage system using a probe position error detecting apparatus according to another exemplary embodiment of the present invention.

FIG. 15 is a timing diagram showing timings of signals of FIG. 14. FIG. 16 is a flowchart showing a probe position error detecting method used for a data storage system using a probe according to another exemplary embodiment of the present invention. FIG. 17 is a flowchart showing a data tracking method of a data storage system using a probe position error detecting apparatus according to another exemplary embodiment of the present invention.

Now, operations of the probe position error detecting method and the data tracking method will be described with reference to FIGS. 15 to 17.

The scanner 1420 moves in the x direction (the scanning direction) at a constant velocity in accordance with a scanning signal $s_x$ shown in (b) of FIG. 15. At the same time, the probe 1400 vibrates in the y direction in accordance with a vibrating signal $s_y$ shown in (c) of FIG. 15. The vibrating signal $s_y$ is a triangular wave having a period T and a slope of 8 R/T. Here, R is a radius of a data pit. It is assumed that there is a disturbance having an x-axis component $d_x$ and a y-axis component $d_y$, and an error comprising an x-axis error $x_d$ and a y-axis error $y_d$ occurs due to the disturbance $d_x$ and $d_y$ as shown in (a) of FIG. 15.

The probe 1400 detects data pits 100a and 100b on the data storage medium 1410 while moving along the trajectory 101a shown in (a) of FIG. 15 in accordance with the scanning and vibrating signals $s_x$ and $s_y$ (Operation 1700). If the probe 1400 passes through the data pits 100a, ON pulses are generated. Otherwise, OFF pulses are generated. As a result, a reproducing signal p having ON and OFF pulses is generated as shown in (d) of FIG. 15. Here, the amplitude of the reproducing signal p is assumed to be 1.

After the data pits on the data storage medium 1410 are detected, a probe position error is detected (Operation 1720). Now, the detecting of the probe position error will be described in detail.

Referring to (a) and (d) of FIG. 15, the probe passes through the data pit 100a in a time interval ($t_a$, $t_b$), and then, the data pit 100b in a time interval ($t_c$, $t_d$) to generate the reproducing signal p. The error comprising the x-axis error $x_d$ and the y-axis error $y_d$ is extracted from the reproducing signal p (Operation 1600). As described above, the x-axis error $x_d$ and the y-axis error $y_d$ are the synchronization error $e_x$ and the track error $e_y$, respectively.

More specifically, in order to extract the synchronization error $e_x$ and the track error $e_y$, an error extracting signals $u_z$ shown in (e) of FIG. 15 is generated. The error extracting signal $u_z$ is associated with the trajectory y (100a and 100b) of the probe 1400 and has amplitude of 1. Next, in the multiplier, output signal (a probe position error) $t_z$ is generated by multiplying the reproducing signal p with the error extracting signal $u_z$ by using Equation 7.

$$t_z = u_z \times p \qquad \text{[Equation 7]}$$

The integrator 1434 integrates the extracted probe position error $t_z$ in units of a half-period T/2 (Operation 1620).

The signal processing unit 1436 generates a probe position error by processing the past half-period position error integrated by the integrator 1434 and a current half-period position error (Operation 1640).

The probe position error generated in Operation 1640 is classified into a synchronization error $e_x$ and a track error $e_y$. The synchronization error $e_x$, that is, a horizontal probe position error, is generated by adding the past half-period probe position error with the current half-period probe position error. The track error $e_y$, that is a vertical probe position error, is generated by using a difference between the current half-period probe position error and the past half-period probe position error. More specifically, the vertical position error, that is, the track error $e_y$, is generated by subtracting the current half-period probe position error added by the position error adding unit from the past half-period probe position error stored in the position error storing unit, in a case where a vertical component of vibration of the probe on the data storage medium increases, and by subtracting the past half-period probe position error stored in the position error storing unit from the current half-period probe position error added by the position error adding unit, in a case where a vertical component of vibration of the probe on the data storage medium decreases in accordance with Equations 5 and 6, respectively. It can be understood that the synchronization error $e_x$ and the track error $e_y$ are linear functions of only the x-axis error $x_d$ and the y-axis error $y_d$, respectively.

The synchronization error $e_x$ and the track error $e_y$ are removed by the compensator 1440 (Operation 1740).

On the other hand, the probe position error tracking method according to the present invention can be applied to compensation of a synchronization error in a case where there is no vibration in the direction perpendicular to the scanning direction.

According to the present invention, since horizontal and vertical errors occurring due to disturbance can be continuously detected by using predetermined extracting signals without any accurate pattern of data pits rather than a conventional data tracking method, it is possible to easily synchronize centers of data pits on a data storage medium and timings of reading and writing and compensate for a track error (the vertical error) by using a controller having a simple structure.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for detecting a probe position error in a data storage system having a data storage medium and a probe for detecting signals by scanning the data storage medium, the apparatus comprising:
    a position error extracting unit which extracts the probe position error from a signal detected by the probe, wherein the position error extracting unit comprises a multiplier which multiplies the signal detected by the probe with an error extracting signal used to extract the probe position error; and
    a position error adding unit which calculates the probe position error for a predetermined time, wherein the position error adding unit comprises an integrator which integrates an output signal of the multiplier for a period of the error extracting signal.

2. The apparatus according to claim 1, wherein the error extracting signal is a square wave having a duty cycle of 50% and a period determined based on a ratio of a distance between data pits on the data storage medium and a scanning velocity of the probe.

3. The apparatus according to claim 1,
    wherein the error extracting signal comprises:
    a horizontal error extracting signal which is a square wave having a duty cycle of 50% and a period determined based on a ratio of a distance between data pits on the data storage medium and a scanning velocity of the probe; and
    a vertical error extracting signal which is synchronized with the horizontal extracting signal and is a square wave having a period twice the period of the horizontal extracting signal,
    wherein the multiplier comprises:
    a horizontal multiplier which multiplies the signal detected by the probe with the horizontal error extracting signal; and a vertical multiplier which multiplies the signal detected by the probe with the vertical error extracting signal, and
    wherein the integrator comprises: a horizontal integrator which integrates an output signal of the horizontal multiplier; and
    a vertical integrator which integrates an output signal of the vertical multiplier.

4. An apparatus for tracking data in a data storage system having a data storage medium and a probe for detecting signals by scanning the data storage medium, the apparatus comprising:
    a scanner which moves the data storage medium;
    a probe which detects a signal from the data storage medium;
    an error detector which detects a probe position error by applying an error extracting signal used to extract the probe position error to the signal detected by the probe; and
    a compensator which compensates for the probe position error detected by the error detector,
    wherein the error detector comprises:
    a multiplier which multiplies the signal detected by the probe with the error extracting signal used to extract the probe position error; and
    an integrator which integrates an output signal of the multiplier for a period of the error extracting signal.

5. The apparatus according to claim 4, wherein the error extracting signal is a square wave having a duty cycle of 50% and a period determined based on a ratio of a distance between data pits on the data storage medium and a scanning velocity of the probe.

6. The apparatus according to claim 4,
    wherein the error extracting signal comprises:
    a horizontal error extracting signal which is a square wave having a duty cycle of 50% and a period determined based on a ratio of a distance between data pits on the data storage medium and a scanning velocity of the probe; and
    a vertical error extracting signal which is synchronized with the horizontal extracting signal and is a square wave having a period twice the period of the horizontal extracting signal,
    wherein the multiplier comprises:
    a horizontal multiplier which multiplies the signal detected by the probe with the horizontal error extracting signal; and
    a vertical multiplier which multiplies the signal detected by the probe with the vertical error extracting signal, and
    wherein the integrator comprises:
    a horizontal integrator which integrates an output signal of the horizontal multiplier; and
    a vertical integrator which integrates an output signal of the vertical multiplier.

7. A method of detecting a probe position error in a data storage system having a data storage medium and a probe for detecting signals by scanning the data storage medium, the method comprising:
    extracting a probe position error from a signal detected by the probe, wherein the extracting of the probe position error is performed by multiplying the signal detected by the probe with an error extracting signal used to extract the probe position error; and integrating the probe position error for a predetermined time.

8. The method according to claim 7, wherein the error extracting signal is a square wave having a duty cycle of 50% and a period determined based on a ratio of a distance between data pits on the data storage medium and a scanning velocity of the probe.

9. The method according to claim 7,
wherein the error extracting signal comprises:
a horizontal error extracting signal which is a square wave having a duty cycle of 50% and a period determined with a ratio of a distance between data pits on the data storage medium and a scanning velocity of the probe; and
a vertical error extracting signal which is synchronized with the horizontal extracting signal and is a square wave having a period twice the period of the horizontal extracting signal,
wherein the extracting of the probe position errors comprises:
multiplying the signal detected by the probe with the horizontal error extracting signal; and
multiplying the signal detected by the probe with the vertical error extracting signal, and
wherein the integrating of the probe position error comprises:
integrating a multiplication value of the horizontal error extracting signal for a predetermined time; and
integrating a multiplication value of the vertical error extracting signal for a predetermined time.

10. A method of tracking data in a data storage system having a data storage medium and a probe for detecting signals by scanning the data storage medium, the method comprising:
detecting a signal from the data storage medium using the probe;
detecting a probe position error from the signal detected by the probe; and compensating for the probe position error.
wherein the detecting of the probe position errors comprises:
extracting the probe position error by applying an error extracting signal to the signal detected by the probe; and
integrating the probe position error which is extracted for a predetermined time.

11. The apparatus according to claim 1, further comprising a signal processing unit which stores a past probe position error calculated by the position error extracting unit and generates a probe position error by processing the past probe position error and a current probe position error.

12. The apparatus according to claim 11, wherein the error extracting signal is a square wave having a duty cycle of 50% and a period determined with a ratio of a distance between data pits on the data storage medium and a scanning velocity of the probe.

13. The apparatus according to claim 11, wherein the signal processing unit comprises:
a position error storing unit which stores a past half-period probe position error calculated by the position error adding unit;
a synchronization error generating unit which generates a horizontal probe position error by adding the past half-period probe position error stored in the position error storing unit to a current half-period probe position error calculated by the position error adding unit; and
a track error generating unit which generates a vertical probe position error by using a difference between a current half-period probe position error calculated by the position error adding unit and the past half-period probe position error stored in the position error storing unit.

14. The apparatus according to claim 13, wherein the vertical position error is generated by subtracting the current half-period probe position error calculated by the position error adding unit from the past half-period probe position error stored in the position error storing unit, in a case where a vertical component of vibration of the probe on the data storage medium increases, and by subtracting the past half-period probe position error stored in the position error storing unit from the current half-period probe position error calculated by the position error adding unit, in a case where the vertical component of vibration of the probe on the data storage medium decreases.

15. An apparatus for tracking data in a data storage system having a data storage medium and a probe for detecting signals by scanning the data storage medium, the apparatus comprising:
a scanner which moves the data storage medium;
a probe which detects a signal from the data storage medium;
an error detector which detects a probe position error in a half-period of an error extracting signal by applying the error extracting signal used to extract the probe position error to the signal detected by the probe; and
a compensator which compensates for the probe position error detected by the error detector.

16. The apparatus according to claim 15, wherein the error detector comprises:
a multiplier which multiplies the signal detected by the probe with the error extracting signal used to extract the probe position errors; and
an integrator which integrates output signals of the multiplier for a half period of the error extracting signal;
a signal processing unit which stores a past half-period position error integrated by the integrator and generating a probe position error by processing the past half-period position error and a current half-period position error.

17. The apparatus according to claim 16, wherein the error extracting signal is a square wave having a duty cycle of 50% and a period determined with a ratio of a distance between data pits on the data storage medium and a scanning velocity of the probe.

18. The apparatus according to claim 16, wherein the signal processing unit comprises:
a position error storing unit which stores a past half-period probe position error added by the position error adding unit;
a synchronization error generating unit which generates a horizontal probe position error by adding the past half-period probe position error stored in the position error storing unit with a current half-period probe position error added by the position error adding unit; and
a track error generating unit which generates a vertical probe position error by using a difference between a current half-period probe position error added by the position error adding unit and the past half-period probe position error stored in the position error storing unit.

19. The method according to claim 7, further comprising generating a probe position error by processing a current integrated probe position error and a past integrated probe position error.

20. The method according to claim 19, wherein the error extracting signal is a square wave having a duty cycle of 50% and a period determined based on a ratio of a distance between data pits on the data storage medium and a scanning velocity of the probe.

21. The method according to claim 19, wherein the generating of the probe position error comprises:
generating a horizontal probe position error by adding the past half-period probe position error and a current half-period probe position error; and
generating a vertical probe position error by using a difference between a current half-period probe position error and the past half-period probe position error.

22. A method of tracking data in a data storage system having a data storage medium and a probe for detecting signals by scanning the data storage medium, the method comprising:
detecting a signal from the data storage medium by using the probe;
extracting a probe position error by applying an error extracting signal to the signal detected by the probe;
integrating the probe position error which is extracted for a predetermined time;
generating a probe position error by processing a current integrated current position error and a past integrated probe position error; and
compensating for the probe position error.

23. The method according to claim 22, wherein the predetermined time is a half period of the error extracting signal.

24. A computer-readable medium storing a program executed by a computer, wherein the program performs a method of detecting a probe position error in a data storage system having a data storage medium and a probe for detecting signals by scanning the data storage medium, the method comprising:
extracting a probe position error from a signal detected by the probe, wherein the extracting of the probe position error is performed by multiplying the signal detected by the probe with an error extracting signal used to extract the probe position error; and
integrating the probe position error for a predetermined time.

25. A computer-readable medium storing a program executed by a computer, wherein the program performs a method of tracking data in a data storage system having a data storage medium and a probe for detecting signals by scanning the data storage medium, the method comprising:
detecting a signal from the data storage medium using the probe;
detecting a probe position error in a half-period of an error extracting signal by applying the error extracting signal used to extract the probe position error to the signal detected by the probe; and
compensating for the probe position error.

26. A computer-readable medium storing a program executed by a computer, wherein the program performs a method of detecting a probe position error in a data storage system having a data storage medium and a probe for detecting signals by scanning the data storage medium, the method comprising:
extracting a probe position error from a signal detected by the probe;
integrating the probe position error for a predetermined time; and
generating a probe position error by processing a current integrated probe position error and a past integrated probe position error.

27. A computer-readable medium storing a program executed by a computer, wherein the program performs a method of tracking data in a data storage system having a data storage medium and a probe for detecting signals by scanning the data storage medium, the method comprising:
detecting a signal from the data storage medium by using the probe;
extracting a probe position error by applying an error extracting signal to the signal detected by the probe;
integrating the probe position error which is extracted for a predetermined time;
generating a probe position error by processing a current integrated current position error and a past integrated probe position error; and
compensating for the probe position error.

* * * * *